(12) United States Patent
Stanek et al.

(10) Patent No.: US 9,555,885 B2
(45) Date of Patent: Jan. 31, 2017

(54) AUTOMOTIVE DRONE DEPLOYMENT SYSTEM

(71) Applicant: Ford Global Technologies, LLC, Dearborn, MI (US)

(72) Inventors: Joseph F. Stanek, Northville, MI (US); John A. Lockwood, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/231,579

(22) Filed: Aug. 8, 2016

(65) Prior Publication Data

US 2016/0347452 A1  Dec. 1, 2016

Related U.S. Application Data

(63) Continuation of application No. 14/333,462, filed on Jul. 16, 2014, now Pat. No. 9,409,644.

(51) Int. Cl.
*B64C 39/00* (2006.01)
*B64C 39/02* (2006.01)
(Continued)

(52) U.S. Cl.
CPC .......... *B64C 39/024* (2013.01); *G05D 1/0088* (2013.01); *G05D 1/0276* (2013.01);
(Continued)

(58) Field of Classification Search
CPC ... G06K 9/00657; B64C 39/024; B64C 39/02; B64C 39/022; B64C 29/00; B64C 29/0091; B64C 29/0008; B64C 2201/08; B64C 2201/082; B64C 2201/084; B64C 2201/086; B64C 2201/088; B64C 2201/12; B64C 2201/126; B64C 2201/128; B64C 2201/14; B64C 2201/18; B64C 2201/182; B64C 2201/185; B64C 2201/187; B64C 2201/20; B64C 2201/208; B64C 2203/00; B64C 2700/6295
(Continued)

(56) References Cited

U.S. PATENT DOCUMENTS 3,917,196 A   11/1975   Pond et al.
4,025,193 A   5/1977    Pond et al.
(Continued)

FOREIGN PATENT DOCUMENTS

CN   203280949 U    11/2013
DE   102011106170   2/2012
(Continued)

OTHER PUBLICATIONS

LA show: BMW goes on ePatrol, Nov. 22, 2012 http://www.goauto.com.au/mellor/mellor.nsf/story2/6F92AB239ECF55B6CA257ABE001EE832.
(Continued)

*Primary Examiner* — McDieunel Marc
*Assistant Examiner* — James E Stroud
(74) *Attorney, Agent, or Firm* — James P. Muraff; Neal, Gerber & Eisenberg, LLP (57) ABSTRACT

This disclosure generally relates to an automotive drone deployment system that includes at least a vehicle and a deployable drone that is configured to attach and detach from the vehicle. More specifically, the disclosure describes the vehicle and drone remaining in communication with each other to exchange information while the vehicle is being operated in an autonomous driving mode so that the vehicle's performance under the autonomous driving mode is enhanced.

20 Claims, 8 Drawing Sheets

(51) Int. Cl.
  *G05D 1/00* (2006.01)
  *G05D 1/02* (2006.01)
(52) U.S. Cl.
  CPC ...... *B64C 2201/08* (2013.01); *B64C 2201/12* (2013.01); *B64C 2201/141* (2013.01); *G05D 2201/0213* (2013.01)
(58) Field of Classification Search
  USPC .......................................................... 701/3
  See application file for complete search history.

(56) References Cited

U.S. PATENT DOCUMENTS

| | | | |
|---|---|---|---|
| 5,299,764 | A | 4/1994 | Scott |
| 5,477,459 | A * | 12/1995 | Clegg ..................... G01S 5/16 356/152.1 |
| 7,913,953 | B2 | 3/2011 | Ellinghaus |
| 2004/0148039 | A1 * | 7/2004 | Farchmin ............. G05B 19/122 700/79 |
| 2006/0145024 | A1 | 7/2006 | Kosmas |
| 2007/0231204 | A1 * | 10/2007 | Hyde ....................... A61L 2/07 422/62 |
| 2009/0043440 | A1 * | 2/2009 | Matsukawa .......... G05D 1/0214 701/25 |
| 2009/0294573 | A1 | 12/2009 | Wilson et al. |
| 2010/0111775 | A1 * | 5/2010 | Hyde ....................... A61L 2/10 422/105 |
| 2011/0002821 | A1 * | 1/2011 | Hyde ....................... A61L 2/07 422/292 |
| 2012/0152654 | A1 | 6/2012 | Marcus |
| 2013/0007935 | A1 | 1/2013 | Chin et al. |
| 2014/0031981 | A1 * | 1/2014 | Fernando ............... G05D 1/024 700/253 |
| 2014/0046589 | A1 | 2/2014 | Metzler |
| 2014/0172297 | A1 * | 6/2014 | Lin ..................... G01C 21/206 701/533 |

FOREIGN PATENT DOCUMENTS

| | | |
|---|---|---|
| FR | 2986647 | 8/2013 |
| JP | 2006180326 | 7/2006 |

OTHER PUBLICATIONS

Renault's KWID Concept comes with its own Flying Companion quadcopter, Feb. 10, 2014 http://www.gizmag.com/renautls-kwid-concept-suv/30765/.

* cited by examiner

AUTOMOTIVE DRONE DEPLOYMENT SYSTEM

PRIORITY CLAIM

The present application is a continuation of U.S. patent application Ser. No. 14/333,462, filed on Jul. 16, 2014, the contents of which are hereby incorporated by reference in their entirety.

TECHNICAL FIELD

This disclosure generally relates to an automotive drone deployment system that includes at least a vehicle and a deployable drone that is configured to attach and detach from the vehicle. More specifically, the disclosure describes the vehicle and drone remaining in communication with each other to exchange information while the vehicle is being operated in an autonomous driving mode so that the vehicle's performance under the autonomous driving mode is enhanced.

BACKGROUND

A vehicle may include various onboard sensors for sensing an environment surrounding the vehicle in order to detect objects and other potential obstacles that may impede the travel of the vehicle. The vehicle may also include onboard communication devices capable of communicating with information servers in order to obtain additional information related to the environment surrounding the vehicle. Such onboard sensors and communication devices may be especially utilized when the vehicle is being operated under an autonomous driving mode where the vehicle relies on the information obtained by sensors and communication devices to operate the propulsion and driving functionalities of the vehicle instead of replying solely on a driver of the vehicle.

It follows that implementing additional systems or components for enhancing the vehicle's ability to obtain information on its surrounding environment in order to enhance the vehicle's driving capabilities under the autonomous driving mode may be desirable.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments provide a drone operational tool running, at least in part, on a vehicle. The drone operational tool may be configured to receive any one or more of vehicle sensor information, vehicle state information, or pre-stored information from a vehicle memory and communicate such information to a detachable drone device, and also receive scouting information from the drone device in response. The drone operational tool may reference the scouting information received from the drone device to update information related to one or more vehicle systems (e.g., navigational system). The drone operational tool may be integrated into existing vehicle systems to allow a passenger to control the drone device through the use of existing vehicle cabin controls (e.g., controls for vehicle infotainment or navigation systems). The drone operational tool may also allow for the control of the drone device to accomplish delivery of items to and from the vehicle.

It follows that according to some embodiments, an apparatus for controlling a drone device is provided. The apparatus may include a memory configured to store drone deployment conditions; an interface configured to transmit information to a drone device; and a processor in communication with the memory and interface. The processor may be configured to: receive vehicle state information; compare the vehicle state information to the drone deployment conditions, and cause a deployment command to be transmitted through the interface to the drone device based on the comparison.

According to some embodiments, a drone deployment system for controlling the deployment of a drone device is provided. The drone deployment system may include a drone device; and a vehicle having the drone device attached. The vehicle may be configured to: store, in a memory, drone deployment conditions; receive vehicle state information from a vehicle state sensor; compare the vehicle state information to the drone deployment conditions, and transmit a deployment command to the drone device based on the comparison. The drone device may further be configured to deploy from the vehicle when the deployment command is received.

According to some embodiments, a method for facilitating the communication between a vehicle and a drone device is provided. The method may comprise operating a vehicle to travel in an autonomous driving mode; transmitting, from the vehicle, a request for scouting information to the drone device; in response to the request, receiving scouting information from the drone device, and updating vehicle information stored on the vehicle based on the scouting information.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

Figure 1:
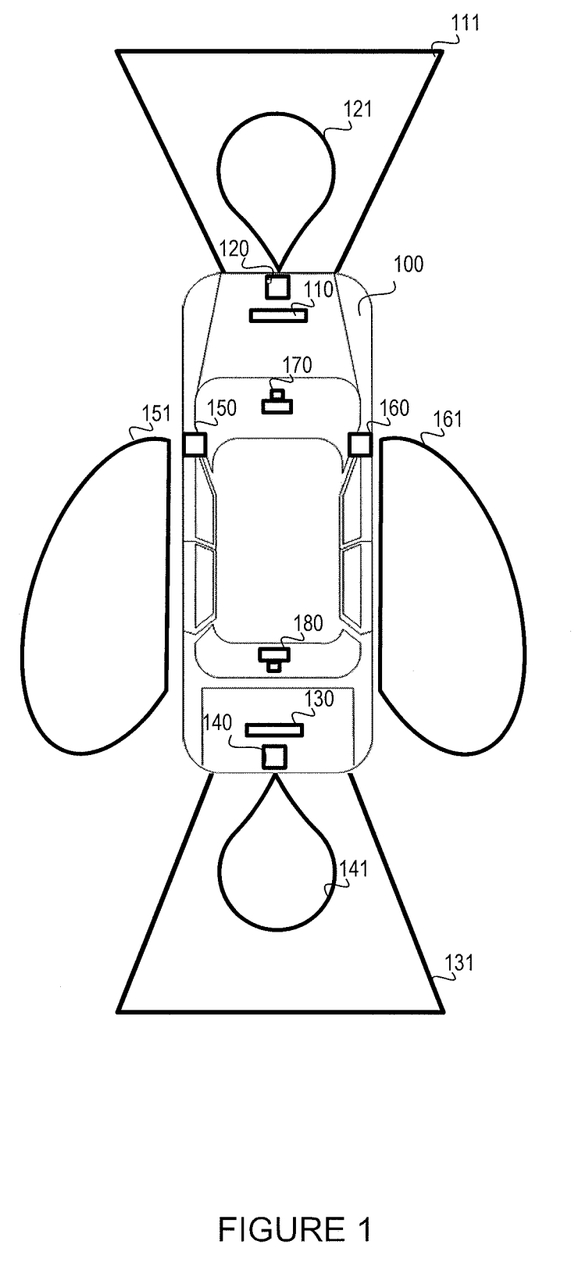
FIG. 1 illustrates an exemplary vehicle including vehicle sensors, according to some embodiments.

The following disclosure is provided for a vehicle operating in an autonomous driving mode that requires little, to no, input from a driver of the vehicle in order to operate the vehicle. During the operation of the vehicle in the autonomous driving mode, the vehicle may rely on sensor inputs obtained by various onboard sensors (i.e., sensors that are attached to the vehicle) that are included in the vehicle system. FIG. 1 illustrates an exemplary vehicle 100 including a number of different sensors that may be utilized during the operation of the vehicle 100 in the autonomous driving mode.

The vehicle 100 illustrated in FIG. 1 includes a front long range sensor 110 configured to sense objects and/or conditions in a front long range area 111. The vehicle 100 also includes a rear long range sensor 130 configured to sense objects and/or conditions in a rear long range area 131. The vehicle 100 also includes a front short range sensor 120 configured to sense objects and/or conditions in a front short range area 121. The vehicle 100 also includes a rear short range sensor 140 configured to sense objects and/or conditions in a rear short range area 141.

The vehicle 100 illustrated in FIG. 1 also includes driver side blind spot sensor 150 configured to sense objects and/or conditions in a driver side area 151. The vehicle 100 also includes a passenger side blind spot sensor 160 configured to sense objects and/or conditions in a passenger side area 161.

The vehicle 100 illustrated in FIG. 1 also includes a front vision system 170 and a rear vision system 180 configured to capture video and/or still images in front of the vehicle 100 and in back of the vehicle 100, respectively. The front vision system 170 and rear vision system 180 may be configured to then analyze the captured video and/or still images, and identify objects or conditions (e.g., lane tracking, front object detection, rear object detection, blind spot object detection) that may be referenced by the front vision system 170 or rear vision system 180 to control one or more components of the vehicle.

The sensors and vision systems described with reference to the vehicle 100 in FIG. 1 may include, but are not limited to, digital/analog cameras, digital/analog video cameras, infrared (IR) sensors, ultrasonic proximity sensors, electromagnetic sensors, Lidar sensors (or other similar spinning range sensor) and other similar types of sensors that may be placed on the vehicle for detecting objects that may surround the vehicle as well as environmental conditions near the vehicle. The vehicle 100 may also include additional vehicle sensors to obtain information on various vehicle attributes and external conditions such as, but not limited to, temperature sensors for measuring a temperature of various vehicle components and/or interior conditions and/or exterior conditions, speed sensors for measuring the traveling speed of the vehicle 100, positioning sensors (e.g., GPS) for identifying a location of the vehicle 100, and other similar types of sensors for obtaining vehicle attribute and/or vehicle state information.

Figure 2:
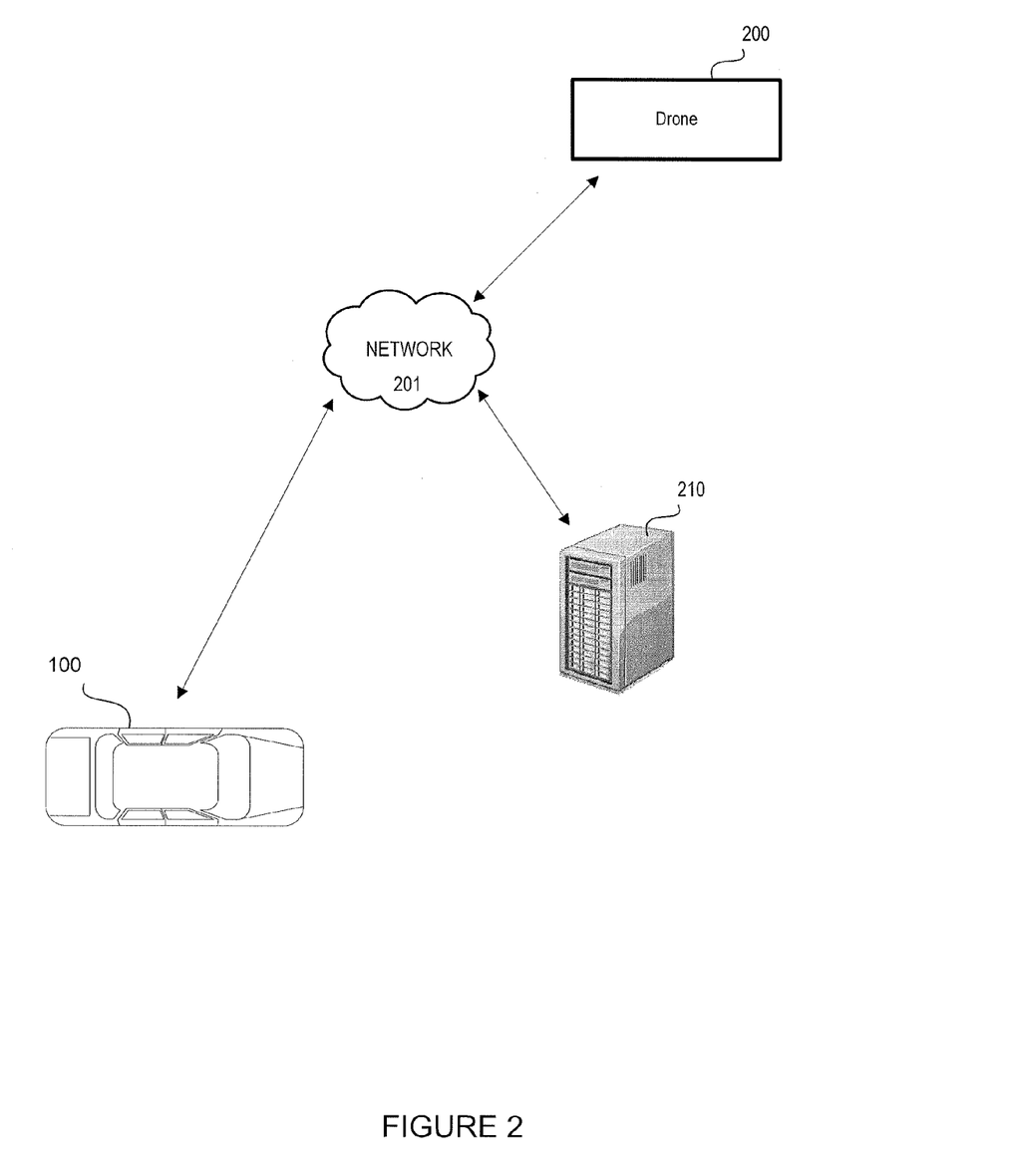
FIG. 2 illustrates an exemplary system including a vehicle, drone device, and a server communicating via a network, according to some embodiments.

The vehicle 100 may also include one or more communication interfaces for communicating with an external source such as the external information server 210 illustrated in FIG. 2. The vehicle 100 may communicate with the information server 210 in order to obtain environmental conditions information (e.g., weather information, temperature information, traffic information, road condition information, etc.) that may be utilized by the vehicle 100 for operating or improving a vehicle capability. The vehicle 100 may communicate with the information server 210 via a network 201, where the network may be a telecommunications network, wifi network, cellular communication network or other available network capable of supporting communication between the vehicle 100 and information server 210. Further description will be provided below related to the utilization of information obtained from an information server 210 as illustrated in FIG. 2.

It follows that each of the sensors, vision systems, and/or communication interfaces described as being part of the vehicle 100 may be utilized to obtain information that may be referenced by the vehicle 100 during an operation of the vehicle 100 in the autonomous driving mode. In other words, the vehicle 100 may receive information obtained from one or more of the sensors and/or systems described as being included in the vehicle 100, analyze the received information, and determine an operational strategy for operating the vehicle 100 in the autonomous driving mode based on the analysis.

It should be noted that the sensors and systems described as being included on the vehicle 100 are provided for exemplary purposes only, as it is within the scope of this disclosure for the vehicle 100 to include a fewer, or greater, number of such sensors and/or systems for obtaining information that may be utilized during the operation of the vehicle 100 in the autonomous mode and/or during an operation of the vehicle that involves a drone component. Further, each of the sensors illustrated in FIG. 1 may be representative of a system of one or more sensors.

It should also be noted that the range and/or shape of the sensing range area (e.g., range areas 111, 121, 131, 141, 151, and 161) illustrated in FIG. 1 is provided for exemplary purposes. The shape of each range area illustrated as corresponding to each of the sensors illustrated in FIG. 1 may, for example, be different based on a range and/or rotation of the sensor.

Although the vehicle 100 may be configured to include one or more of the sensors, systems, and communication interfaces as described with reference to FIG. 1 and FIG. 2 above, there is a limit to the physical range of objects and conditions that may be detected by such vehicle onboard components. For example, each of the onboard sensors illustrated in FIG. 1 has a limitation in the range (i.e., distance) at which objects and/or conditions can be detected. This limitation may be based on whether the sensors are given a direct line of sight in front of the sensors to detect objects or whether there are impediments (e.g., sensors may be covered with dirt that degrades the sensor's ability to accurately detect objects in front of it) that may block the direct line of sight for the sensors to effectively detect objects in front of them. This limitation may also be simply related to the physical sensing limitations of the sensors themselves that results in a physical distance limit at which each of the sensors are capable of detecting objects and/or conditions in front of them. Regardless of the cause behind the onboard sensor's range limitations, it follows that such range limitation of the onboard sensors may also directly limit a speed at which the vehicle 100 may travel under the autonomous driving mode. This is because one of the limiting factors on how fast the vehicle 100 may be operated to travel is a range distance of how far ahead, sideways, or back when traveling backwards, the vehicle 100 is able to detect objects and conditions.

In a simple example, the top speed at which the vehicle 100 is controlled to travel under the autonomous driving mode may be calculated as a factor of how far ahead the sensors can detect objects, and how much processing time is predicted to be needed to implement a change in the driving pattern (i.e., reduce speed or implement a lane change by controlling a steering mechanism) of the vehicle 100 to avoid any potential obstacles that are detected. So if it is known that a physical range limitation of the front long range sensor 110 is 100 ft., and the vehicle will require at least 2 s to implement a change in the vehicle operation, it follows that the maximum speed for the vehicle 100 should not go past around 34 mph to allow the vehicle 100 enough time to detect an object and implement a change in vehicle operation to avoid the object. This is only a basic estimate, as the top speed may be further decreased to account for other factors that may further increase the time the vehicle requires to implement the change in vehicle operation to avoid any detected obstacles or conditions that should be avoided by the vehicle 100 while it is operating in the autonomous driving mode.

Therefore, one of the goals of the innovation described by this disclosure is to provide a deployable drone device 200, as introduced in FIG. 2, for increasing a physical range distance in which the vehicle 100 is able to obtain information on its surrounding environment. In other words, the drone device 200 is introduced to the vehicle system in order to extend the range at which the vehicle 100 is able to obtain information on its surroundings beyond the range of any one or more sensors, visual systems, and/or communications interfaces that may be onboard the vehicle 100. The drone device 200 may be a quadricopter, or other similar type of air travel capable model. In some embodiments, the drone device 200 may alternatively be a terrestrial model capable of land travel, or a marine model capable of traveling on top or under water. Further description on how the drone device 200 is deployed to obtain additional information on the environment surrounding the vehicle 100 will be provided in more detail below.

Figure 3:
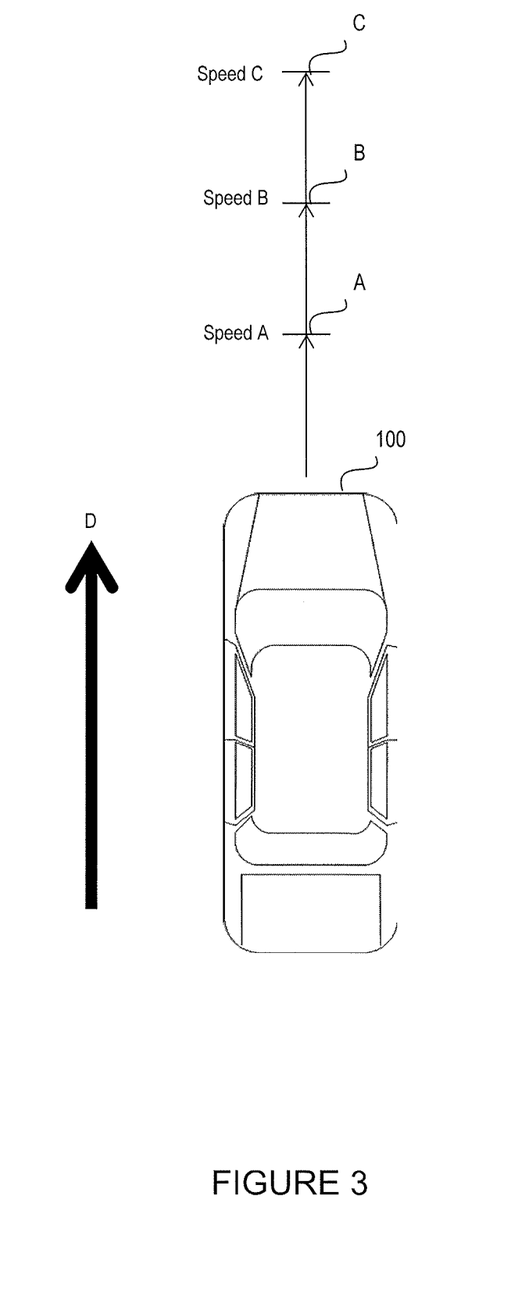
FIG. 3 illustrates an exemplary calculation of a distance at which objects in front of a vehicle may be sensed for the vehicle to be traveling at certain speeds under an autonomous driving mode, according to some embodiments.

It follows that a drone operational tool is provided for at least determining a range/distance at which objects in front, or otherwise in the direction of travel of a vehicle, of the vehicle should be able to be detected by either onboard sensors or the drone device 200 to travel at a desired speed under the autonomous driving mode. For example, FIG. 3 illustrates the vehicle 100 traveling in direction D. FIG. 3 also identifies various range limitation distances (e.g., distance A, distance B, distance C) that represent a distance in front of the vehicle 100 that the vehicle 100 may be capable of sensing objects and/or conditions via onboard sensors (e.g., any one or more of the onboard sensors illustrated in FIG. 1) or the drone device 200. The distances may correspond to any known unit of distance such as, but not limited to, feet, meters, miles, kilometers, or yards. FIG. 3 also identifies corresponding speeds (e.g., Speed A, Speed B, Speed C) at which the vehicle 100 may travel, when operating under the autonomous driving mode, for each of the object sensing range limitations. The traveling speeds may correspond to any known measurement of speed such as, but not limited to, meters per second, feet per second, miles per hour, or kilometers per hour.

According to the exemplary conditions illustrated in FIG. 3, when the vehicle 100 is able to detect objects and/or conditions at least a distance of A in front of the vehicle 100, the vehicle 100 may travel at least at Speed A during operation under the autonomous driving mode. As another example, when the vehicle 100 is able to detect objects and/or conditions at least a distance of B in front of the vehicle 100, the vehicle 100 may travel at least at Speed B during operation under the autonomous driving mode. As another example, when the vehicle 100 is able to detect objects and/or conditions at least a distance of C in front of the vehicle 100, the vehicle 100 may travel at least at Speed C during operation under the autonomous driving mode. The speed at which the vehicle 100 is allowed to travel under the autonomous driving mode and knowing the range limitation distances of the vehicle 100, may be determined by the drone operational tool in order to allow enough time for the vehicle 100 to implement a change in vehicle operation in view of an object or condition detected at within the range limitation distance. It follows that the use of the drone device 200 may extend the range limitations of the vehicle 100 to go beyond the range limitations of the onboard sensors, which in turn may allow the vehicle 100 to travel at higher speeds under the autonomous driving mode.

With respect to FIG. 3, although the vehicle 100 is illustrated as traveling in a straight line path, it is within the scope of this disclosure to have the drone operational tool calculate the range limitation distances when the vehicle 100 is not traveling in a straight line path. In other words, the drone operational tool may calculate the range limitation distance for the vehicle 100 when the vehicle 100 is known or predicted to travel in a non-straight line path. This feature that allows the drone operational tool to "look around corners" may be implemented when the vehicle 100 is traveling on a path that includes one or more curves, turns, and/or elevation changes. The drone operational tool is capable of calculating the range limitation distance for the vehicle 100 traveling in non-straight line paths by receiving and referencing geographical information on the vehicle 100 in real-time, as well as receiving and referencing anticipated traveling information on the vehicle 100 based on a known traveling path of the vehicle 100 to a known destination. The geographical information may correspond to, for example, longitudinal and/or lateral movements of the vehicle 100 obtained from received GPS information.

The features described herein may be implemented by the drone operational tool running, at least in part, on the vehicle 100 and/or the drone device 200. The drone operational tool may be a program, application, and/or some combination of software and hardware that is incorporated on one or more of the components that comprise the vehicle's operating system and/or drone device operating system. Further description for the drone operational tool and the components of the vehicle system and/or drone device system running the drone operational tool is described in more detail below.

Figure 4:
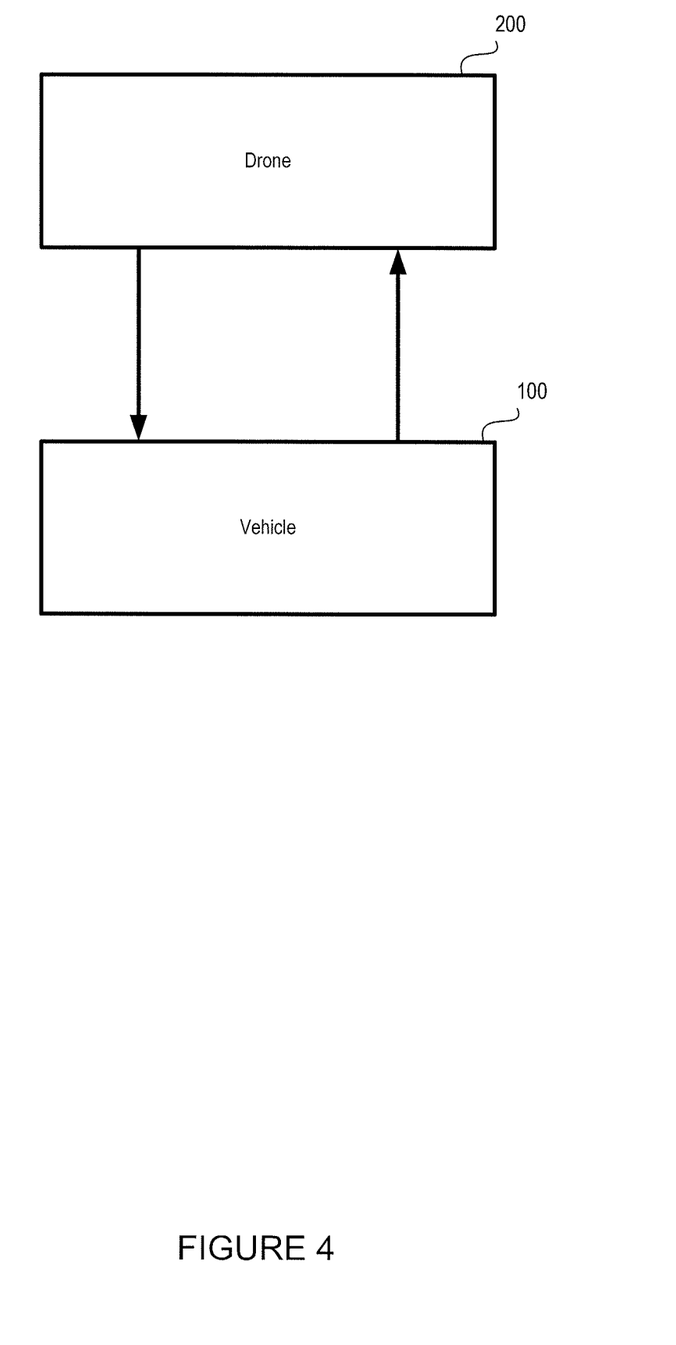
FIG. 4 illustrates an exemplary block diagram allowing for the communication between a vehicle and a drone device.

The drone device 200 may be a deployable component of an overall vehicle system, where the vehicle system includes one or more of the vehicle 100, drone device 200, and the external information server 210, as illustrated in FIG. 2. The drone device 200 may include any one or more of the sensors, visual systems, and/or communications interfaces found onboard the vehicle 100 and as described with reference to FIG. 1. The drone device 200 may be initially attached to the vehicle 100 before being detached/deployed from the vehicle 100. The drone device 200 is capable of maintaining communication with the vehicle 100 while in both the deployed state and attached state, as illustrated in the block diagram of FIG. 4. This capability allows the drone device 200 to report back information to the vehicle 100 on objects and conditions that exist beyond the range of any of the vehicle's onboard sensors. In addition, communication between the vehicle 100 and the drone device 200 may allow the vehicle 100 to update the drone device 200 with information that may facilitate a safer and more efficient deployment and reattachment process for the drone device 200. Further description will be provided in more detail below.

According to some embodiments, the drone device 200 may be deployed from the vehicle 100 to identify objects and/or conditions that exist in an environment surrounding the vehicle 100. For example, the drone device 100 may identify other vehicles, pedestrians, road blocks, curbs, potholes, downed trees, landslides, flooded roads, or other obstacles that may impede the vehicle 100 from traveling. This capability of the drone device 100 may be especially helpful in rural areas where the onboard sensors and/or communication interfaces on the vehicle 100 may not be effective in gathering information on the surrounding environment due to greater impedances in the line of sight to the onboard sensors and/or lack of information on such rural areas that may be obtained from information servers. In such cases, the drone device 200 may be deployed from the vehicle 100 in order to travel ahead of the vehicle 100, obtain information on objects and other environmental conditions that may exist along a predicted path of the vehicle 100 operating under the autonomous driving mode, and transmit the information back to the vehicle 100 via a network such as the network 201 identified in FIG. 2. The information transmitted back to the vehicle 100 may, for example, be digital images, live-streaming video, digital video clips, or sensed object information from one or more of the onboard sensors to the drone device 200. The information may then be presented to a passenger within the vehicle cabin by, for example, displaying on a display unit within the vehicle cabin (e.g., center consoles, heads up display, infotainment display, navigation display, etc.).

According to some embodiments, the drone device 200 may be deployed from the vehicle 100 to identify traffic and road conditions that may exist along a predicted traveling path for the vehicle operating under the autonomous driving mode. When driving in a congested area or navigating along unknown roads, there may be a need to be better informed on the roads and issues lying ahead. Therefore, the drone device 200 may be deployed from the vehicle 100 in order to travel ahead of the vehicle 100 and gather information related to upcoming road conditions to may be impeding travel, as well as traffic information that predicts travel time. For example, the drone device 200 may travel ahead and identify the cause of a traffic issue (e.g., a traffic accident or object left on the road), and report this information back to the vehicle 100. The drone device 200 may also detect a flow of traffic in front of the vehicle 100 and along a predicted path of the vehicle, and report back the traffic flow information back to the vehicle 100. The information transmitted back to the vehicle 100 may, for example, be digital images, live-streaming video, digital video clips, or sensed object information from one or more of the onboard sensors to the drone device 200. The information may then be presented to a passenger within the vehicle cabin by, for example, displaying on a display unit within the vehicle cabin (e.g., center consoles, heads up display, infotainment display, navigation display, etc.).

In some embodiments, the information received from the drone device 200 may be analyzed in view of information already known to the vehicle 100. For example, the vehicle 100 may have previously received traffic flow information from an information server. However, based on the new traffic flow information received from the drone device 200, the vehicle 100 may update its previously received traffic flow information from the information server with the traffic flow information received from the drone device 200. In this way, the vehicle 100 may update already known information to obtain a more accurate traffic flow report. In another example, the navigation system included with the vehicle 100 may have inadequate navigational coverage over certain rural areas such that road and terrain information may be missing for some rural areas. Or the navigation system may not have been recently updated such that newer roads are missing from its navigational maps. In such cases where the navigational system is missing current navigational data, the drone device 200 may obtain navigational data such as the identification (e.g., taking a picture of a new road's nameplate) of a new road, the identification of the navigational properties (e.g., mapping out the path of the new road), and then providing the obtained navigational data to the vehicle 100. The vehicle 100 may then analyze the received navigational data from the drone device 200, and update its navigational system to incorporate the new navigational data (e.g., to include the new road identified by the drone device 200).

According to some embodiments, the drone device 200 may be deployed from the vehicle 100 to observe a destination location and transmit information observed about the destination location back to the vehicle 100. During the operation of the vehicle 100 under the autonomous driving mode, a destination location may be input to the vehicle 100. Based on this information identifying the destination location, the drone device 200 may be deployed and sent to the destination location. Once arriving at the destination location, the drone device 200 may gather information around the destination location via any one or more of the onboard sensors, visual systems, or communications interfaces. The gathered information may then be transmitted back to the vehicle 100. The transmitted information may, for example, be digital images, live-streaming video, digital video clips, or sensed object information from one or more of the onboard sensors to the drone device 200. The information may then be presented to a passenger within the vehicle cabin by, for example, displaying on a display unit within the vehicle cabin (e.g., center consoles, heads up display, infotainment display, navigation display, etc.).

According to some embodiments, the drone device 200 may be deployed from the vehicle 100 to retrieve an item from a pick up location, or deliver an item to a delivery location. It follows that the drone device 200 may be equipped with a cargo storing capability in order to carry an item while in a deployed state from the vehicle 100. The item may, for example, be a curing item that has been identified by the drone deployment tool as an item that may be useful in curing a need of the vehicle 100. For example, based on the drone deployment tool identifying a need for gasoline, or additional vehicle batteries, the drone deployment tool may then send command instructions to the drone device 200 to retrieve curing items such as gasoline, or additional vehicle batteries, to refuel or re-power the vehicle 100 when the vehicle 100 has stalled outside of walking distance to a gas station or other store selling such curing items. By doing so, the drone device 200 may be utilized by the vehicle 100 to retrieve the curing items instead. The command instructions may additionally identify a location of one or more gas stations or other storefronts that may sell such curing items identified in the command instructions, thus allowing the drone device 200 to locate and navigate to the location.

In such cases where a purchasing feature is required, the drone device 200 may additionally be equipped with financial information corresponding to a passenger of the vehicle 100 such that the item (e.g., gasoline) being picked up may be purchased remotely. For example, the passenger may input financial information corresponding to a financial account corresponding to the passenger (e.g., checking account, credit card account, savings account, or other similar financial account that may be used to transact a purchase). In addition, the passenger may input information identifying the merchant that is authorized to charge the passenger's financial account for the purchase of the pickup item. In this way, a secure transaction may be enacted via the drone device 200.

In addition to the travel (e.g., airborne), data collection, and cargo transportation capabilities described above, another important feature of the drone device 200 is its integration with the vehicle system. Because of the communication link between the drone device 200 and the vehicle 100 that may be maintained during both a deployed and attached state, onboard vehicle systems and components may be utilized to enhance the operation of the drone device 200, as well as control the operation of the drone device 200. For instance, information obtained by any one or more of the onboard vehicle sensors, visual systems, and/or communications interfaces as described in FIG. 1 may be transmitted to the drone device 200 for further analysis by the drone device 200.

Similarly, the vehicle's GPS information that identifies a location of the vehicle 100 may be communicated to the drone device 200 while the drone device 200 is deployed from the vehicle 100 so that the drone device 200 may better locate the vehicle 100 for reattachment.

As described above, information received from the drone device 200 may be displayed within the vehicle cabin by, for example, displaying on a display unit within the vehicle cabin (e.g., center consoles, heads up display, infotainment display, navigation display, etc.). It follows that information gathered by the drone device 200 may be superimposed onto an in-cabin display such as navigation maps and/or alert messages. For example, new navigational data such as the identification of a new road that is unknown to the vehicle navigation system may be superimposed onto a map that is being displayed on a navigation display. In this way, the new or updated information obtained by the drone device 200 may be immediately displayed on an existing vehicle system, such as the navigation system.

Also, vehicle controls may be utilized to control the operation of the drone device 200. For example, control inputs for a vehicle infotainment system may also serve to control the flight, navigation, information gathering, and other operational controls of the drone device 200 while it is in a deployed state for gathering information to be transmitted back to the vehicle 100, as well as to control operational commands during an attached state. Alternatively, a set of dedicated drone controls may be provided within the cabin of the vehicle 100 that may be used exclusively for inputting operational commands for controlling the drone device 200 during both deployed and attached states.

Figure 5:
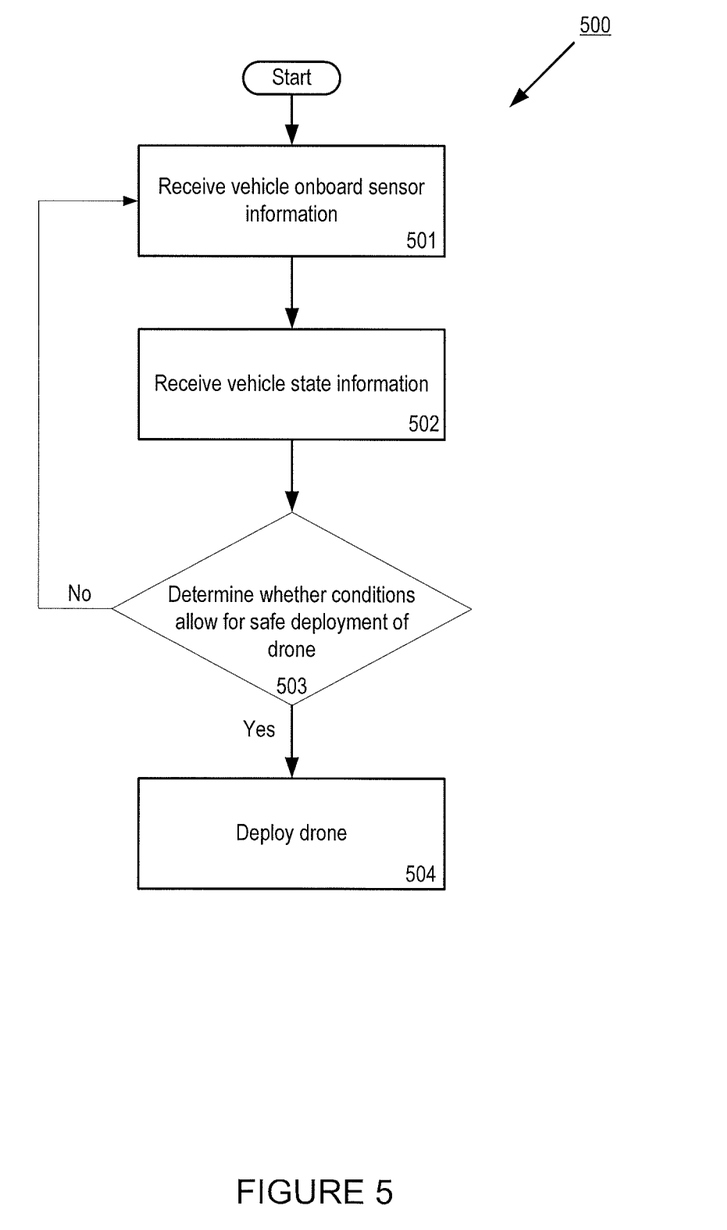
FIG. 5 illustrates an exemplary flowchart describing a process implemented by a drone operational tool, according to some embodiments.

FIG. 5 illustrates a flowchart 500 that describes a process for the drone operational tool to determine whether to deploy a drone device from a vehicle. For example, the drone operational tool may be determining whether to deploy the drone device 200 from the vehicle 100 as described herein. The process described by flowchart 500 may be an automated process, where the drone operational tool determines whether deployment conditions are met based on received information, and the drone operational tool causes a drone deployment command to be transmitted to the drone device 200 when the deployment conditions are determined to be met. Further description is provided below.

At 501, the drone operational tool may receive vehicle onboard sensor information. The onboard sensor information may correspond to any one or more of the sensor information received from any one or more of the onboard vehicle sensors described with reference to FIG. 1. The drone operational tool may also receive information from onboard visual systems (e.g., digital images and/or video) and/or communications interfaces (e.g., information from an information server) as described with reference to FIG. 1.

At 502, the drone operational tool may receive vehicle state information. The vehicle state information may include information on a vehicle traveling speed, vehicle location, vehicle fuel level, vehicle temperature, vehicle diagnostic information related to fluid levels or battery charge levels or tire pressure levels, or other vehicle state information that may affect the operation of the vehicle 100. In some embodiments, the vehicle state information may be part of the sensor information received at 501, in which case steps 502 and 501 may be combined.

At 503, the drone operational tool may then determine whether deployment conditions for deploying the drone device 200 have been met based, at least in part, on the information gathered from steps 501 and/or step 502. For instance, the information gathered at steps 501 and/or 502 may be compared against drone deployment conditions. The information describing the deployment conditions may be pre-stored on a memory unit that is included as part of the overall vehicle system, where the deployment conditions stored on the memory unit may be referenced by the drone operational tool in order to compare against the information gathered from steps 501 and/or step 502.

The deployment condition may identify that the drone device 200 should be deployed when one or more sensors utilized for the implementation of the vehicle 100 operating under the autonomous driving mode is recognized as providing inadequate sensor data (e.g., the sensor has either failed, or the sensed information is inaccurate or inadequate). When the inadequacy of one or more such sensors is identified, the drone operational tool may initiate the deployment of the drone device 200 at step 504 so that the drone device 200 may obtain the missing sensor information (i.e., the sensor information that is not available due to the sensor providing inadequate sensor data) while in the deployed state, and transmit the missing sensor information back to the vehicle 100. By deploying the drone device 200 to obtain the missing sensor information, the vehicle 100 may continue to operate under the autonomous driving mode.

The deployment condition may identify that the drone device 200 should be deployed when the current traveling speed, or an inputted desired traveling speed, of the vehicle 100 meets or exceeds a threshold speed. The threshold speed at which the deployment conditions calls for deployment of the drone device 200 may correspond to a traveling speed that goes beyond the sensing capabilities of the vehicle onboard sensors, visual systems, or communication interfaces as described above with reference to FIG. 1. In other words, the threshold speed from the deployment conditions may be recognized by the drone operational tool as a situation where the drone device 200 needs to be deployed in order to utilize the added sensing capabilities (i.e., added range distances for detecting objects and/or other environmental conditions that are out of the range for onboard sensors, visual systems, or communication interfaces) of the deployed drone device 200. The threshold speed may be a predetermined speed stored within a memory of the vehicle 100, or a speed calculated by the drone operational tool according to any one or more of the methods described herein.

The deployment condition may also identify one or more specified vehicle locations where the drone device 200 should be deployed. The specified vehicle locations that should initiate a deployment of the drone device 200 may be pre-stored, or determined from an analysis by the drone operational tool. For example, the vehicle state information received at 502 may identify a current, or future, location of the vehicle 100. The drone operational tool may then compare the current, or future, location of the vehicle 100 against a pre-stored list of specified locations where the drone device 200 should be deployed from the vehicle 100. Such specified locations may correspond to known rural areas where the vehicle navigation system is known to have inadequate mapping information, or other navigational information, or an area where the drone operational tool predicts the fuel usage of the vehicle 100 will leave the vehicle 100 stranded before reaching the next gas station. Alternatively, the drone operational tool may compare the current location information for the vehicle 100 and compare it against the existing navigational mapping data for the vehicle navigation system. If the existing navigational mapping data is found by the drone operational tool as having inadequate mapping information, or other navigational information, then the drone operational tool may determine that the deployment condition is met. In either scenario, the drone device 200 may be deployed at 504 in order to gather additional navigational information to make up for the known deficiency in navigational information.

The deployment condition may also identify that the drone device 200 should be deployed when the fuel level as identified from vehicle state information at 502 meets, or falls below, a predetermined threshold level. The threshold information may be stored on a memory unit that is part of the vehicle system.

The deployment condition may also identify that the drone device 200 should be deployed when the vehicle temperature level as identified from vehicle state information at 502 meets, or falls below, a predetermined threshold level. The vehicle temperature level may correspond to an engine temperature, or temperature for another vehicle component. The threshold information may be stored on a memory unit that is part of the vehicle system.

The deployment condition may also identify that the drone device 200 should be deployed when certain vehicle diagnostic levels as identified from vehicle state information at 502 meets, exceed, or fall below certain thresholds. The threshold information may be stored on a memory unit that is part of the vehicle system. For example, the deployment condition may identify that the drone device 200 should be deployed when one or more vehicle fluid levels meets, exceeds, or falls below a predetermined threshold amount. The deployment condition may identify that the drone device 200 should be deployed when a battery charge level meets, or falls below, a predetermined threshold level. The deployment condition may identify that the drone device 200 should be deployed when a tire pressure level for one or more tires meets, or falls below, a predetermined threshold level.

The deployment conditions described are provided for exemplary purposes only, as other deployment conditions may be provided based on the information received at either 501 and/or 502.

When the drone operational tool determines that one or more deployment conditions have been satisfied at 503, the process may proceed to step 504 where the drone operational tool may cause a deployment command to be transmitted through an interface to the drone device 200 such that the drone device 200 may initiate a deployment process. However, if the drone operational tool determines that at least one deployment condition has not been satisfied, then the process may revert back to 501.

The steps identified in the flowchart 500 are provided for exemplary purposes only, as additional, or fewer, steps may be included in a process for determining whether to deploy the drone device 200.

For instance at step 504, instead of the drone operational tool causing a deployment command to be transmitted through an interface to the drone device 200 such that the drone device 200 may initiate a deployment process, the drone operational tool may locate another drone device that is already in a deployed state. By doing so, the vehicle 100 may not be required to carry its own drone device, and instead allow the vehicle 100 to communicate with a drone device already in a deployed state. Such a drone device may be shared by other vehicles requesting to gain access to the drone device in order to operate the drone device according to the features described throughout this disclosure. In order to gain access to an already deployed drone device, the drone operational tool may locate the already deployed drone device, transmit a request to operate the already deployed drone device, receive a response to the request to operate from the already deployed drone device that either allows or denies the drone operational tool to begin operating the already deployed drone device, and transmit operational commands to the already deployed drone device in order to operate the already deployed drone device according to any one or more of the features described throughout this disclosure.

The already deployed drone device may, for example, be a shared airborne-type drone device that is expected to remain deployed for long periods of time. An example of such an airborne-type drone device is an unmanned aerial vehicle (UAV) that is designed to remain in flight for long periods of time. The already deployed drone device may also be shared amongst one or more vehicles that are also running the same, or similar, drone operational tool. This allows the already deployed drone device to be time-shared amongst one or more vehicles, such that the vehicles do not need to employ their own drone devices.

Figure 6:
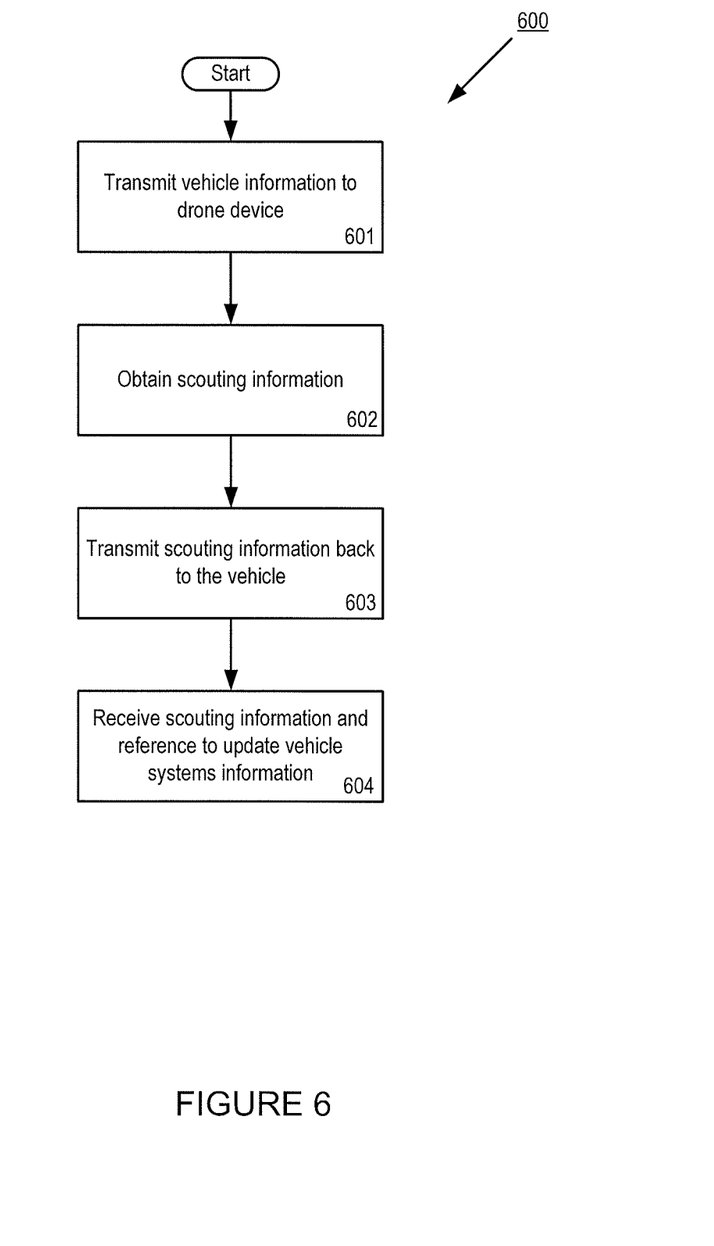
FIG. 6 illustrates an exemplary flowchart describing a process implemented by a drone operational tool, according to some embodiments

FIG. 6 illustrates a flowchart 600 that describes a process for the drone operational tool to facilitate communication between a vehicle and a drone device. For example, the drone operational tool may be facilitating communication between the drone device 200 and the vehicle 100 as described herein. The process embodied by flowchart 600 takes place while the drone device 200 is deployed and detached from the vehicle 100. Therefore, the communication between the vehicle 100 and drone device 200 may be made according to any one or more networks described herein that allow for wireless communication of information and data.

At 601, the drone operational tool running, at least in part, on the vehicle 100 may cause the vehicle to transmit vehicle information to the drone device 200 through a communications interface that is included as part of the vehicle system. The vehicle information may correspond to any of the information described herein that may be obtained from onboard vehicle sensors, visual systems, and/or communications interfaces. The vehicle information may also include any one or more of the vehicle state information as described herein.

At 602, the drone operational tool running, at least in part, on the drone device 200 may receive the vehicle information and cause the drone device 200 to seek and obtain scouting information based on the received vehicle information. The scouting information obtained by the drone device 200 may correspond to information obtained from onboard drone device sensors, visual systems, and/or communications interfaces as described herein. Further, the scouting information obtained by the drone device 200 may be in response to received vehicle information in accordance to any one or more of the features described throughout this disclosure. For example, based on vehicle information that identifies the vehicle 100 is running low on fuel, the drone operational tool may cause the drone device 200 to locate a nearby gas station, identify a location of the nearby gas station, and transmit the gas station location information back to the vehicle 200. As another example, based on vehicle information that identifies the vehicle 100 is currently in an area where the navigational system has inadequate mapping information, the drone operational tool may cause the drone device 200 to identify navigational information (e.g., previously unidentified streets, previously unidentified street names, previously unidentified paths, previously unidentified upcoming hazards, previously unidentified upcoming terrain information, etc.) that may be transmitted back to the vehicle 100 in order to update the navigational system's mapping information.

At 603, the drone operational tool may cause the drone device 200 to transmit the scouting information back to the vehicle 100 via a network, as describe throughout this disclosure.

At 604, the vehicle 100 may receive the scouting information from the drone device 200 and reference such scouting information to update vehicle systems information. Based on the received scouting information, one or more vehicle systems may be updated in accordance to any one or more of the features described herein. For example, scouting information that includes new mapping information may be received by the vehicle 100 and then superimposed onto a navigational display that may have previously lacked the new mapping information. A more detailed description of such a feature is described in more detail in other portions of this disclosure.

The steps identified in the flowchart 600 are provided for exemplary purposes only, as additional, or fewer, steps may be included in a process for facilitating communication between the vehicle 100 and the deployed drone device 200.

Figure 7:
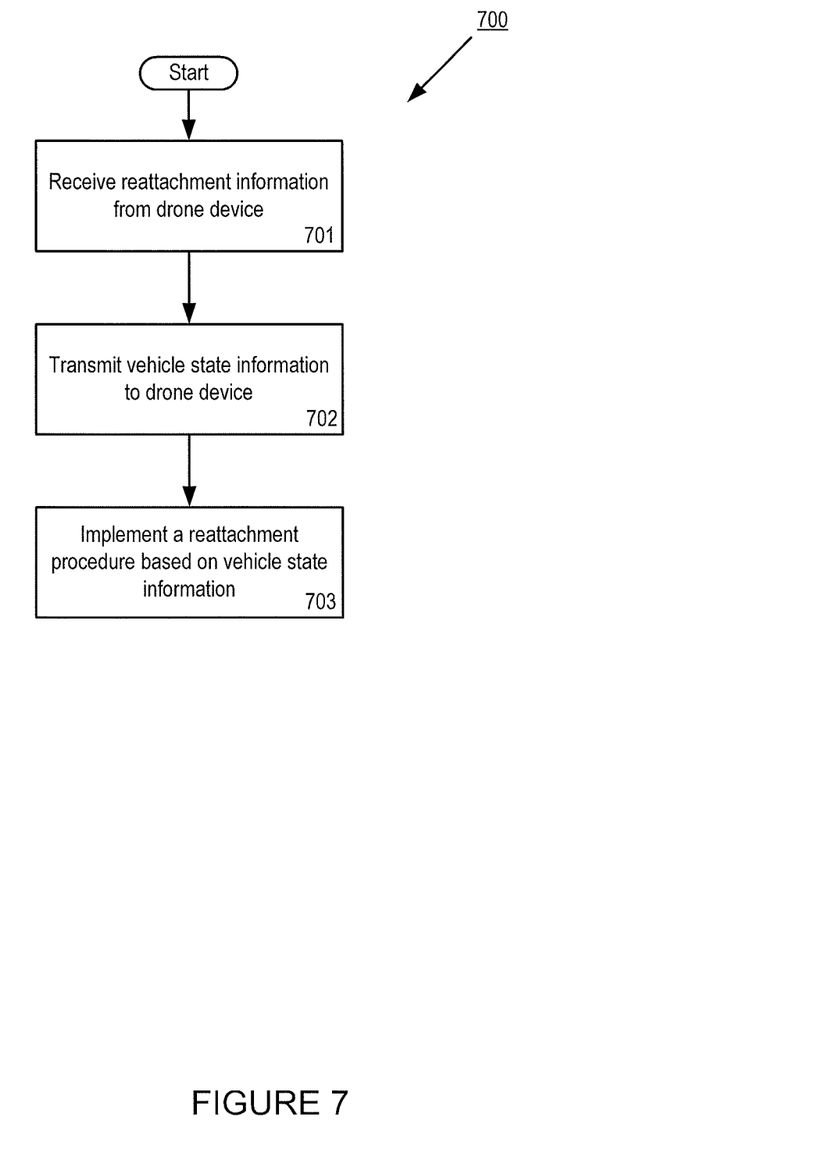
FIG. 7 illustrates an exemplary flowchart describing a process implemented by a drone operational tool, according to some embodiments.

FIG. 7 illustrates a flowchart 700 that describes a process for the drone operational tool to facilitate a deployed drone device attempting to reattach to a vehicle. For example, the drone operational tool may be facilitating the drone device 200 attempting to reattach to the vehicle 100. The process embodied by flowchart 700 takes place while the drone device 200 is deployed and detached from the vehicle 100. Therefore, the communication between the vehicle 100 and drone device 200 may be made according to any one or more networks described herein that allow for wireless communication of information and data.

At 701, the drone operational tool running, at least in part, on the drone device 200 may transmit its reattachment intentions to be received by the vehicle 100. Alternatively, the drone operational tool running, at least in part, on the vehicle 100 may transmit a reattachment command to the deployed drone device 200, which is then received by the drone device 200.

At 702, the drone operational tool running, at least in part, on the vehicle 100 may cause the vehicle to transmit vehicle state information to the drone device 200. The transmitted vehicle state information may correspond to any one or more of the vehicle state information described throughout this disclosure. For example, the vehicle state information may identify a speed at which the vehicle 100 is traveling.

At 703, the drone operational tool running, at least in part, may receive the vehicle state information and implement the reattachment process based at least in part on the received vehicle state information. For example, based on the vehicle state information that identifies the traveling speed of the vehicle 100, the drone operating tool may cause the drone device 200 to match the speed of the vehicle 100 to ensure a smoother reattachment process.

The steps identified in the flowchart 700 are provided for exemplary purposes only, as additional, or fewer, steps may be included in a process for implementing a reattachment process.

Figure 8:
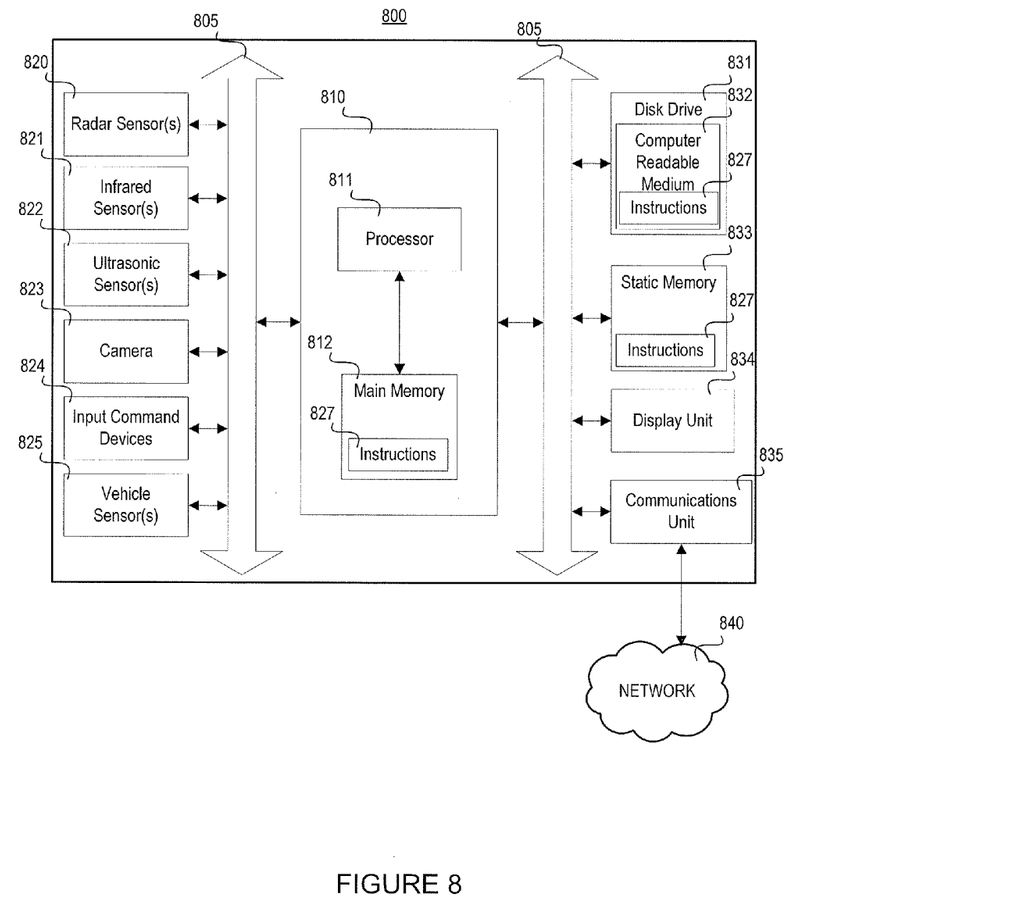
FIG. 8 illustrates an exemplary computer system that may that may be part of a vehicle system or drone device system according to some embodiments.

Referring to FIG. 8, an illustrative embodiment of a computing system 800 that may be used as an apparatus within a vehicle system for implementing any one or more of the methods, features, and processes of the drone operational tool discussed herein, is shown and designated by the computing system 800. The computing system may be an embodiment of a computing system included on the vehicle 100, drone device 200, or information server 210 described herein.

The computing system 800 may include a processing unit 810 comprised of a processor 811 in communication with a main memory 812, wherein the main memory 812 stores a set of instructions 827 that may be executed by the processor 811 to cause the computing system 800 to perform any one or more of the methods, processes or computer-based functions disclosed herein. For example, the drone operational tool described throughout this disclosure may be a program that is comprised of the set of instructions 827 that are executed to perform any one or more of the methods, processes or computer-based functions described herein such as the processes for determining whether to deploy a drone device as described with reference to FIG. 5, facilitating communication between a vehicle and a deployed drone device with reference to FIG. 8, and implementing a reattachment process as described with reference to FIG. 7. The computing system 800 may be integrated into the vehicle. The computing system 800 may also be connected using a network such as network 201 illustrated in FIG. 2, to communicate with other computer systems or peripheral devices.

In a networked deployment, the computing system 800 may operate in the capacity of a server or as a client user computer within the vehicle system in a server-client user network environment, or as a peer computer system within a vehicle in a peer-to-peer (or distributed) network environment. Further, while a single computing system 800 is illustrated, the term "system" shall also be taken to include any collection of systems or sub-systems that individually or jointly execute a set, or multiple sets, of instructions to perform one or more computer functions.

As illustrated in FIG. 8, the computing system 800 may include the processor 811, such as a central processing unit ("CPU"), although the processor 811 may be representative of one or more processing units. Moreover, the computing system 800 can include the main memory 812 and a static memory 822 that can communicate with each other via a bus 805. As shown, the computing system 800 may further include a display unit 834, such as a liquid crystal display ("LCD"), an organic light emitting diode ("OLED"), a flat panel display, a solid state display, or a cathode ray tube ("CRT"). The display unit 834 may correspond to a display component of a navigation system, vehicle infotainment system, a heads-up display, or instrument panel of the vehicle described herein. Additionally, the computing system 800 may include one or more input command devices 824 for allowing a passenger of the vehicle to control the drone device described herein. The input command devices may be a control knob, instrument panel, keyboard, scanner, digital camera for image capture and/or visual command recognition, touch screen or audio input device (e.g., cabin microphone), buttons, a mouse or touchpad.

The computing system 800 may further be comprised of system input components that include, but are not limited to, radar sensor(s) 820, infrared sensor(s) 821, ultrasonic sensor(s) 822, camera 823 (e.g., capable of capturing digital still images, streaming video, and digital video), and vehicle sensor(s) 825 (e.g., temperature sensors, fluid level sensors, vehicle speed detection sensors, etc.). The drone operational tool may receive information inputs from one or more of these system input components. The input components are in communication with the processing unit 810 via the communications bus 805.

The computing system 800 can also include a disk drive unit 831 for receiving a computer readable medium 832. In a particular embodiment, the disk drive unit 831 may receive the computer-readable medium 832 in which one or more sets of instructions 827, such as the software corresponding to the drone operational tool, can be embedded. Further, the instructions 827 may embody one or more of the methods or logic as described herein. In a particular embodiment, the instructions 827 may reside completely, or at least partially, within any one or more of the main memory 812, the static memory 833, computer readable medium 832, and/or within the processor 811 during execution of the instructions 827 by the processor 811.

The computing system 800 may further include a communications interface 835. The communications interface 835 may be comprised of a network interface (either wired or wireless) for communication with an external network 840. The external network 840 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, other telecommunications networks and others available at the time of the filing of this application or that may be developed in the future. Further, the network 840 may be a public network, such as the Internet, a private network, such as an intranet, or combinations thereof, and may utilize a variety of networking protocols now available or later developed including, but not limited to TCP/IP based networking protocols. The network 840 may also be embodied as the network 201 described with reference to FIG. 2.

In some embodiments the program that embodies the drone operational tool may be downloaded and stored on any one or more of the main memory 812, computer readable medium 832, or static memory 833 via transmission through the network 840 from an off-site server.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computing system 800. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. Accordingly, the disclosure is considered to include any one or more of a computer-readable medium or a distribution medium and other equivalents and successor media, in which data or instructions may be stored.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims. For instance, although the disclosure provided herein is described in terms of a vehicle operating in an autonomous driving mode, the features described herein may also be applicable to the vehicle operating in a non-autonomous mode (i.e., when a driver is operating the vehicle).

The invention claimed is:

1. A drone deployment system comprising:
   an aerial drone in operative communication with a vehicle and being configured to land on, and attach to, the vehicle, the drone comprising a plurality of sensors configured to sense external objects;
   the vehicle comprising a plurality of sensors including one or more leading sensors configured to sense external objects leading the vehicle, a communications interface configured to send information to and receive information from the aerial drone, and processor(s) configured to:
   determine a vehicle speed;
   estimate a leading sensing range of the one or more leading sensors;
   determine a desired leading sensing range of the one or more leading sensors based on the determined vehicle speed;
   compare the estimated leading sensing range with the desired leading sensing range;
   command the drone to detach from the vehicle and fly based on the comparison.

2. The system of claim 1, wherein the vehicle speed is a desired vehicle speed or an actual vehicle speed and wherein the processor(s) are configured to:
   autonomously steer the vehicle based on inputs from the plurality of sensors;
   autonomously accelerate the vehicle based on inputs from the plurality of sensors;
   enforce a speed cap on the vehicle;
   vary the enforced speed cap based on the estimated leading sensing range of the one or more leading sensors.

3. The system of claim 2, wherein the processor(s) are configured to:
   command the drone to detach from the vehicle and fly to a location leading the vehicle;
   receive information sent from the deployed drone, the information relating to one or more measurements performed by the sensors of the drone.

4. The system of claim 3, wherein the processor(s) are configured to:
   evaluate the received information sent from the deployed drone;
   increase the enforced speed cap based on the evaluated information.

5. The system of claim 4, wherein the processor(s) are configured to:
   instruct the drone to perform one or more measurements of an area leading the vehicle and located outside of the estimated leading sensing range of the one or more leading sensors.

6. The system of claim 4, wherein the processor(s) are configured to:
   instruct the drone to fly to a specified location, the specified location being based on the estimated leading sensing range of the one or more leading sensors.

7. The system of claim 4, wherein the processor(s) are configured to:
   receive a user-specified destination for the vehicle;
   determine a traveling path of the vehicle based on the user-specified destination;
   instruct the drone to fly along a route;
   determine the route based on the determined traveling path.

8. The system of claim 7, wherein the processor(s) are configured to:
   instruct the drone to fly to the user-specified destination location.

9. The system of claim 1, wherein the processor(s) are configured to:
   analyze the information reported by the one or more leading sensors to identify a malfunctioning leading sensor;
   instruct the drone to deploy based on the detection of a malfunctioning leading sensor.

10. The system of claim 9, wherein the processor(s) are configured to:
    determine a location based on the identified malfunctioning leading sensor;
    instruct the drone to fly to the location.

11. A method of controlling an aerial drone and a vehicle;
    wherein the drone is in operative communication with the vehicle and is configured to land on, and attach to, the vehicle, the drone comprising a plurality of sensors configured to sense external objects;
    wherein the vehicle comprises a plurality of sensors including one or more leading sensors configured to sense external objects leading the vehicle, a communications interface configured to send information to and receive information from the aerial drone, and processor(s);
    the method comprising, via the processor(s):
    determining a vehicle speed;
    estimating a leading sensing range of the one or more leading sensors;
    determining a desired leading sensing range of the one or more leading sensors based on the determined vehicle speed;
    comparing the estimated leading sensing range with the desired leading sensing range;
    commanding the drone to detach from the vehicle and aerially deploy based on the comparison.

12. The method of claim 11, wherein the vehicle speed is a desired vehicle speed or an actual vehicle speed and the method comprises:
    autonomously steering the vehicle based on inputs from the plurality of sensors;
    autonomously accelerating the vehicle based on inputs from the plurality of sensors;
    enforcing a velocity cap on the vehicle;
    varying the enforced velocity cap based on the estimated leading sensing range of the one or more leading sensors.

13. The method of claim 12, comprising:
commanding the drone to detach from the vehicle and fly to a location leading the vehicle;
receiving information sent from the deployed drone at the vehicle, the information relating to one or more measurements performed by the sensors of the drone.

14. The method of claim 13, comprising:
evaluating the received information sent from the deployed drone;
increasing the enforced velocity cap based on the evaluated information.

15. The method of claim 14, comprising:
instructing the drone to perform one or more measurements of an area leading the vehicle and located outside of the estimated leading sensing range of the one or more leading sensors.

16. The method of claim 14, comprising:
instructing the drone to fly to a specified location, the specified location being based on the estimated leading sensing range of the one or more leading sensors.

17. The method of claim 14, comprising:
receiving a user-specified destination for the vehicle;
determining a traveling path of the vehicle based on the user-specified destination;
instructing the drone to fly along a route;
determining the route based on the determined traveling path.

18. The method of claim 17, comprising:
instructing the drone to fly to the user-specified destination location.

19. The method of claim 11, comprising:
analyzing the information reported by the one or more leading sensors to identify a malfunctioning leading sensor;
instructing the drone to deploy based on the detection of a malfunctioning leading sensor.

20. The method of claim 19, comprising:
determining a location based on the identified malfunctioning leading sensor;
instructing the drone to fly to the location.

* * * * *